May 30, 1939.  J. MAGEE ET AL  2,160,275
STRAW SPREADER
Filed Oct. 8, 1937  2 Sheets-Sheet 1
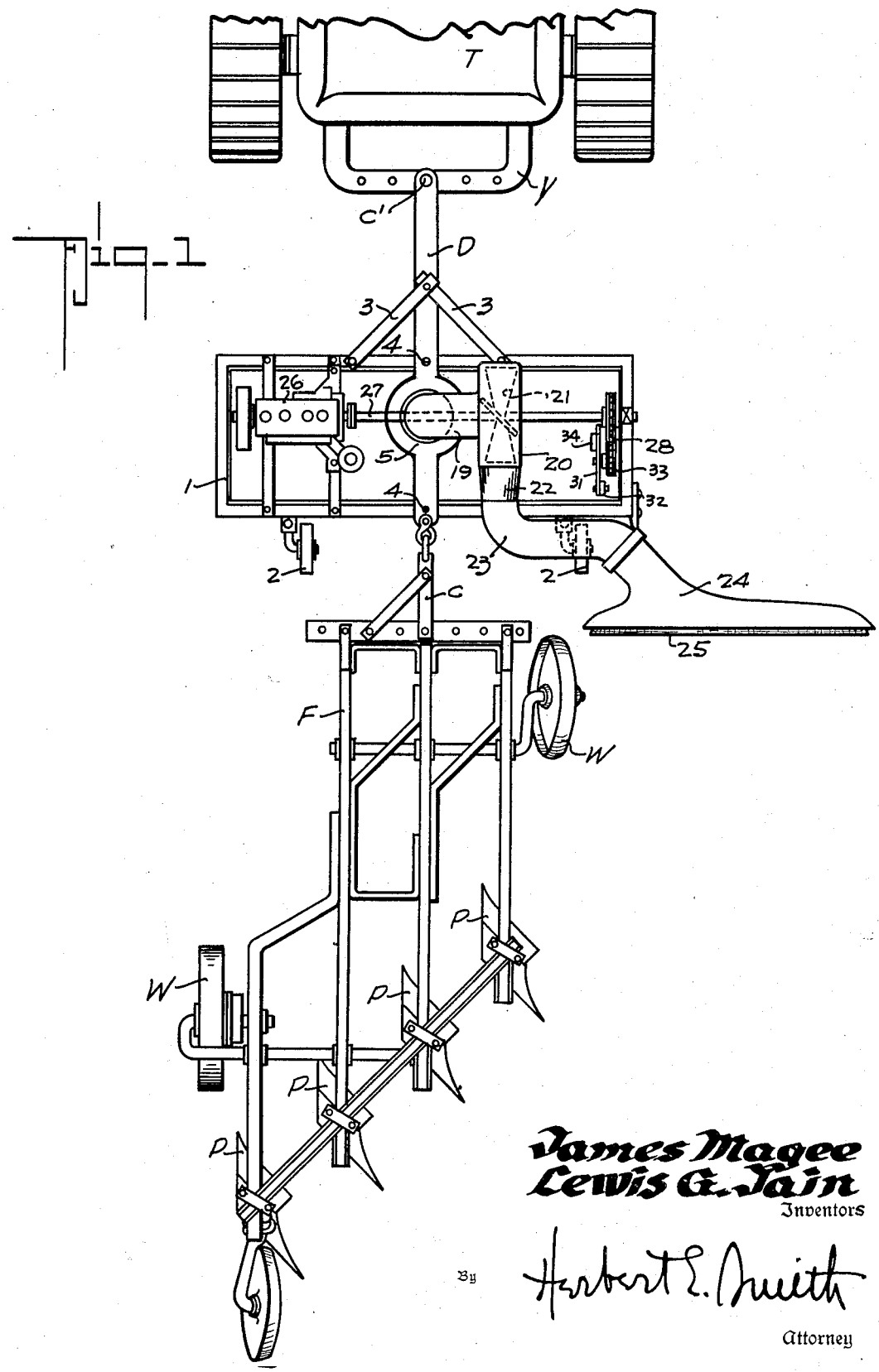
James Magee
Lewis G. Jain
Inventors
By Herbert E. Smith
Attorney

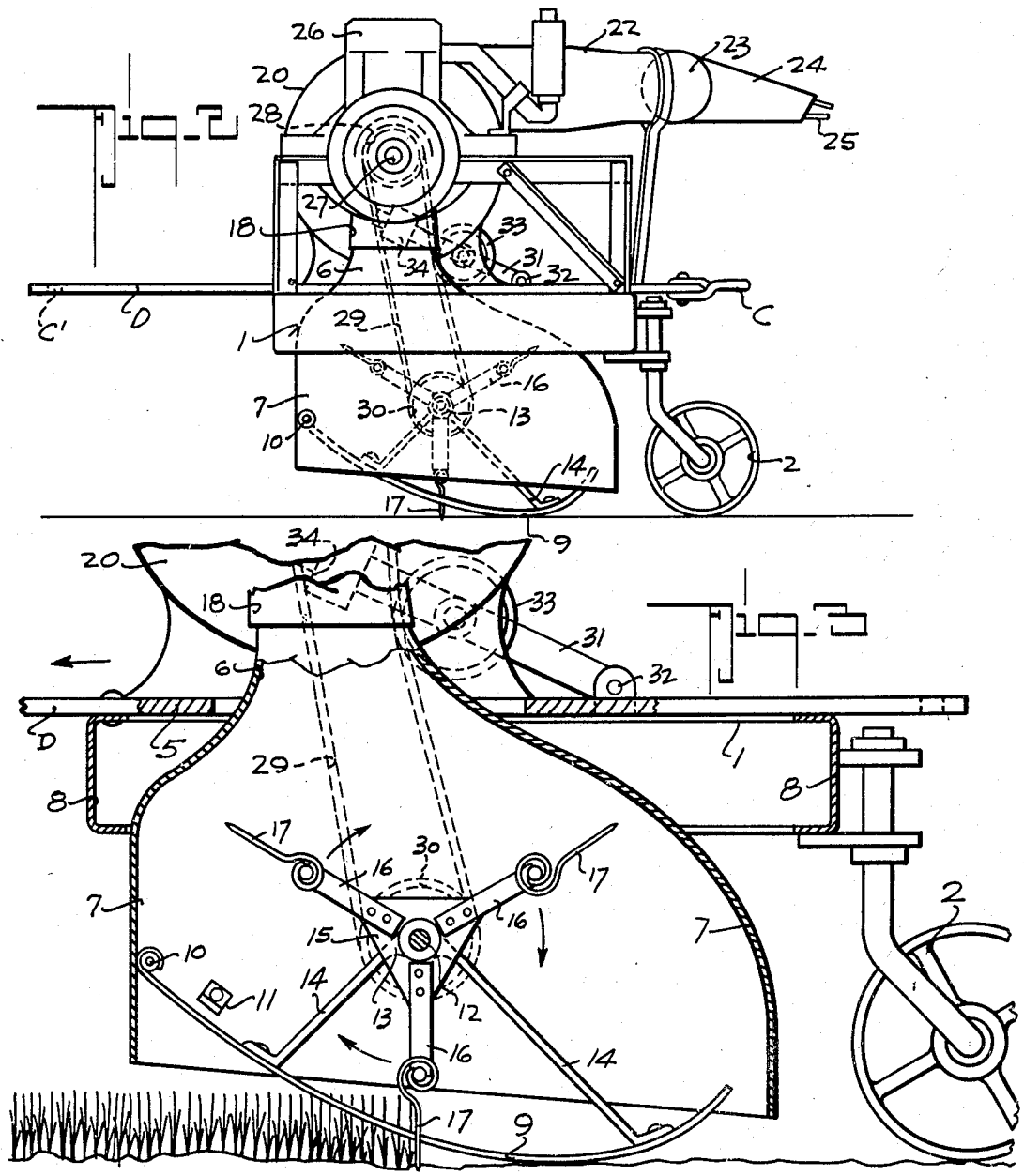

Patented May 30, 1939

2,160,275

UNITED STATES PATENT OFFICE 2,160,275

STRAW SPREADER

James Magee and Lewis G. Jain, Genesee, Idaho

Application October 8, 1937, Serial No. 167,964

6 Claims. (Cl. 275—2)

Our present invention relates to improvements in straw spreaders or agricultural implements designed especially for use in combination with plows of the gang type, as an auxiliary pneumatic mechanism, for the purpose of gathering and removing stubble, straw roots, and other field-trash, from in front of an advancing plow, and for simultaneously spreading or distributing such trash over the next, previously plowed stretch of soil. This trash remaining on last year's field is thus gathered, removed, and distributed or spread over the plowed field as an aid in the cultivation of the soil, and particularly for the purpose of conserving moisture for use in the soil of the field, thereby enhancing the conditions for a favorable crop subsequently planted in the field.

In carrying out our invention we preferably utilize our gathering and spreading implement in combination with the plow, as a gang plow, and the auxiliary implement of our invention is preferably coupled in between, or interposed between, the pulling-tractor and the gang plow. Thus our auxiliary implement gathers the trash from the unplowed field in front of the advancing plows, conveys the gathering trash laterally or transversely of the plows, and then distributes or spreads the trash rearwardly over the plowed furrows at one side of the furrows that are being plowed.

We have illustrated a motor-operated trash-gathering and spreading mechanism operated independently of the pulling-tractor, but it will be understood that other arrangements may be made for transmitting power to the auxiliary mechanism, and various changes and alterations may be made in the general arrangement and operation of parts herein shown in the exemplifying drawings.

The invention consists in certain novel combinations and arrangements of parts as will hereinafter be more fully set forth and claimed. In the drawings we have disclosed one embodiment of our invention where the parts are combined and arranged according to one mode for the practical application of the principles of our invention, but as before stated, changes and alterations may be made in the disclosure, within the scope of our claims without departing from the principles of our invention.

Figure 1 is a plan view of an agricultural implement embodying our invention and showing a portion of a pulling-tractor, a gang plow, and our pneumatic trash gatherer and spreader interposed between the tractor and the plows.

Figure 2 is a side elevation of the auxiliary implement as seen from the left in Figure 1, but separated from the plow and tractor as a unitary structure.

Figure 3 is an enlarged detail vertical sectional view of part of the auxiliary implement, showing the gathering-housing and the trash-gatherers in their relation to the stubble-field, and one of the supporting shoes or runners for the housing.

In order that the general arrangement and utility of parts may readily be understood we have shown in Figure 1 a portion of a pulling-tractor T with its rear coupling yoke Y, to which the draft bar D is coupled in usual manner. At the rear end of this longitudinally extending draw-bar or draft bar D, a coupling C is shown for the frame F of the gang-plow that includes four plows P and the usual supporting wheels W.

The auxiliary implement is mounted on a rectangular frame I that is interposed between the tractor and the plow, in front of the plow, and in position to gather the trash from the soil-surface in advance of the plows. This frame I is supported by caster wheels 2, 2, and diagonal braces 3, 3, connect the frame with the draw bar, and in addition, the draw bar is bolted as at 4, 4 to the frame. The draw bar thus extends longitudinally of the agricultural implement, across the top of the frame I to which it is rigidly fixed, and the interposed auxiliary implement may with facility be coupled at C' to the front tractor, and at C be coupled to the plow, for use, and with equal facility the auxiliary implement may be uncoupled and removed when desired.

As best seen in Figure 1 the draw bar D is fashioned with a substantial ring 5 forming a well in which is located the upwardly projecting neck 6 that forms a discharge opening for trash from a housing 7, which housing extends transversely of the implement with its open bottom properly elevated above the soil-surface, and the housing has a floating suspension with relation to the frame I of the auxiliary implement, just behind a cross beam 8 of the frame which beam forms a guard, brace, or guide for the housing.

For resiliently supporting this floating housing we provide two or more shoes, or runners 9, 9, in the form of curved spring blades that are hinged at 10 inside of the front wall of the housing, and stops 11 on the side walls of the housing prevent excessive up and down movement of the housing as it travels over rough surfaces of the field.

Within the housing is mounted a rotary reel, which as best seen in Figure 3, dislodges and gathers the trash from the field, and lifts the trash in the housing so that the trash may readily be conveyed from the housing by air currents, and eventually be distributed on the plowed portions of the field. For this purpose we provide a rotary reel within the housing that includes a transversely extending shaft 12, journaled in bearings 13 that are mounted on bearing brackets 14 superimposed on the runners 9, or the bearings may be mounted on the walls of the housing with one end of the shaft extending therethrough. On the shaft are mounted or fixed a number of spider frames spaced along the longitudinal axis of the shaft, each of which, as shown in Figure 3 includes a center plate 15 rigid with the shaft, radial arms 16, and spring fingers 17 mounted at the extremities of the radial arms in position to pick up the trash and lift it into the air within the housing in order that air currents passing upwardly through the housing will convey the trash therefrom.

As indicated in Figures 2 and 3 the neck 6 of the housing may project upwardly a substantial distance into a hood 18 that is angular in shape, with a horizontal leg 19, which forms the center intake to an air-fan casing 20 that is rigidly mounted on the frame 1, and a rotary fan 21 is indicated by dotted lines in Figure 1 for purpose of creating air currents upwardly through the housing, its neck, and the hood into the fan casing, carrying the trash therewith. The fan casing has a peripheral outlet 22 extending to the rear, and an elbow-pipe 23 attached to this outlet, has attached thereto a distributing or spreading nozzle 24 for the trash. To prevent undue scattering of the ejected trash from the nozzle, flexible tongues as 25, 25 are secured along the lips of the mouth of the nozzle, and these lips which may be strips of canvas, are blown open by the blast or currents of air passing through the nozzle to permit ejection of the trash from the nozzle.

The rotary reel in the housing and the rotary fan 21 are both operated by power from a suitable motor as 26 mounted on the frame of the auxiliary implement, and the shaft 27 from the motor passes horizontally through the hood 18 and the fan casing, the fan being mounted on the shaft as indicated in Figure 1. This power shaft is also provided with a driving sprocket wheel 28 located above the frame 1, and a sprocket chain 29 extends from this driving sprocket to a driven sprocket 30 on the reel-shaft 12, for rotating the reel.

To hold the sprocket chain taut for smooth operation of the sprocket-drive in transmitting power to the reel, regardless of the up-and-down movements of the reel over rough surfaces, we provide a compensating belt tightener, or chain tightener, best shown in Figures 2 and 3, and comprising a gravity lever-arm 31 pivoted or hinged at 32 on the frame 1. On the lever arm is journaled a pulley or sprocket 33 bearing against one flight of the sprocket chain, and the free end of this lever arm is provided with an adjustable weight 34, which weight may be adjusted on the arm to vary the pressure of the guide sprocket 33 on the sprocket chain. The sprocket 33, of course, bearing against the sprocket chain, tightens the chain when the distance between the drive sprocket and the driven sprocket is decreased, and the chain thus flexed is straightened out against pressure of the guide sprocket when the distance is increased.

The lower, open end or mouth of the housing 7, as indicated in Figures 1 and 3 is rectangular in shape, and the housing occupies the space within the auxiliary frame 1, in front of the advancing gang of plows P, and the housing is vertically adjusted so that its open bottom, or mouth, will pass over the stubble-field as indicated in Figure 3, with sufficient space beneath the housing to permit the upward air currents, induced by the fan, to enter the housing and pass up through the neck, the hood and into the fan casing. The rotary gathering-reel is adjusted to proper position so that the pickers or fingers 17 will pass through the field-trash, pick it up and lift it, so that the trash is caught by the air currents and passed to the ejecting nozzle for distribution. As indicated by the arrows in Figure 3 the rotary reel turns clockwise to lift the trash in the direction of travel of the hood or housing 7, and the air-currents entering the open bottom of the housing from all directions gather the trash and prevent any substantial loss of the material.

The picker-reel, having its resilient support on the runners or spring blades 9, 9, moves up and down with the flexible, resilient runners as the latter pass over uneven or rough soil-surfaces, and the fingers 17, therefore are constantly in proper position to pick up, or tear up, the trash from the field.

While we have illustrated the spreader as an auxiliary in use with a gang plow and tractor, it will be obvious that it may be used in conjunction with harrows, and other cultivating implements, and further this spreader may be coupled to the tractor and used independently of other agricultural implements.

Having thus fully described our invention, what we claim as new and desire to secure by Letters Patent is:

1. The combination with a pulling-tractor, a spaced gang-plow, and an intermediate trash-spreader, of coupling means between the tractor and the spreader, coupling means between the spreader and the gang-plow, means mounted on the spreader for gathering field-trash in front of the advancing plows, means for distributing the gathered field-trash from the spreader to a plowed field, and operating mechanism for these two latter means.

2. The combination with a pulling-tractor, a spaced gang-plow, and a trash-spreader coupled between the tractor and the gang-plow, of a rotary gathering-reel mounted on the spreader, a pneumatic conveyer co-operating with the gathering reel, means for distributing gathered-trash from the conveyer, means for operating the gathering reel, and means for operating the pneumatic conveyer.

3. The combination with a pulling-tractor, a spaced gang-plow, and a trash-spreader coupled between the tractor and the gang-plow, of a housing mounted on the spreader, a rotary gathering-reel enclosed within the housing and operable within its open lower end, a pneumatic trash-conveyer communicating with the housing, means for distributing trash from the conveyer, operating means mounted on the spreader, and power-transmitting means between said operating means, the trash-conveyer, and the distributing means.

4. In a trash spreader, the combination with a supporting frame, an open-bottom housing mounted in the frame, resilient flexible supports mounted within the housing, and a rotary gathering reel mounted on said supports, of a pneumatic conveyer communicating with the housing above the reel and a discharge nozzle for said conveyer, means for operating the reel, and means for operating the pneumatic conveyer.

5. In a trash spreader, the combination with a supporting frame, an open-bottom housing mounted in the frame, resilient flexible ground-shoes hinged within the housing, and a rotary trash-gathering reel mounted on said supports, of a pneumatic conveyer including a suction fan communicating with the upper end of the housing, a discharge nozzle for said conveyer, a motor mounted on the frame, a driving shaft between the motor and said fan, and driving mechanism between said shaft and the rotary reel.

6. In a trash-spreader, the combination with a supporting frame, an open-bottom housing mounted in the frame, resilient flexible ground-shoes and hinged connections between the front ends of said shoes and the housing, a rotary trash-gathering reel mounted on said shoes, operating mechanism for said reel including a driving belt, and means for tightening said belt, of a pneumatic conveyer communicating with said housing and a discharge nozzle for the conveyer, means for operating the conveyer, and means for operating the driving belt.

JAMES MAGEE.
LEWIS G. JAIN.